Patented Sept. 1, 1953

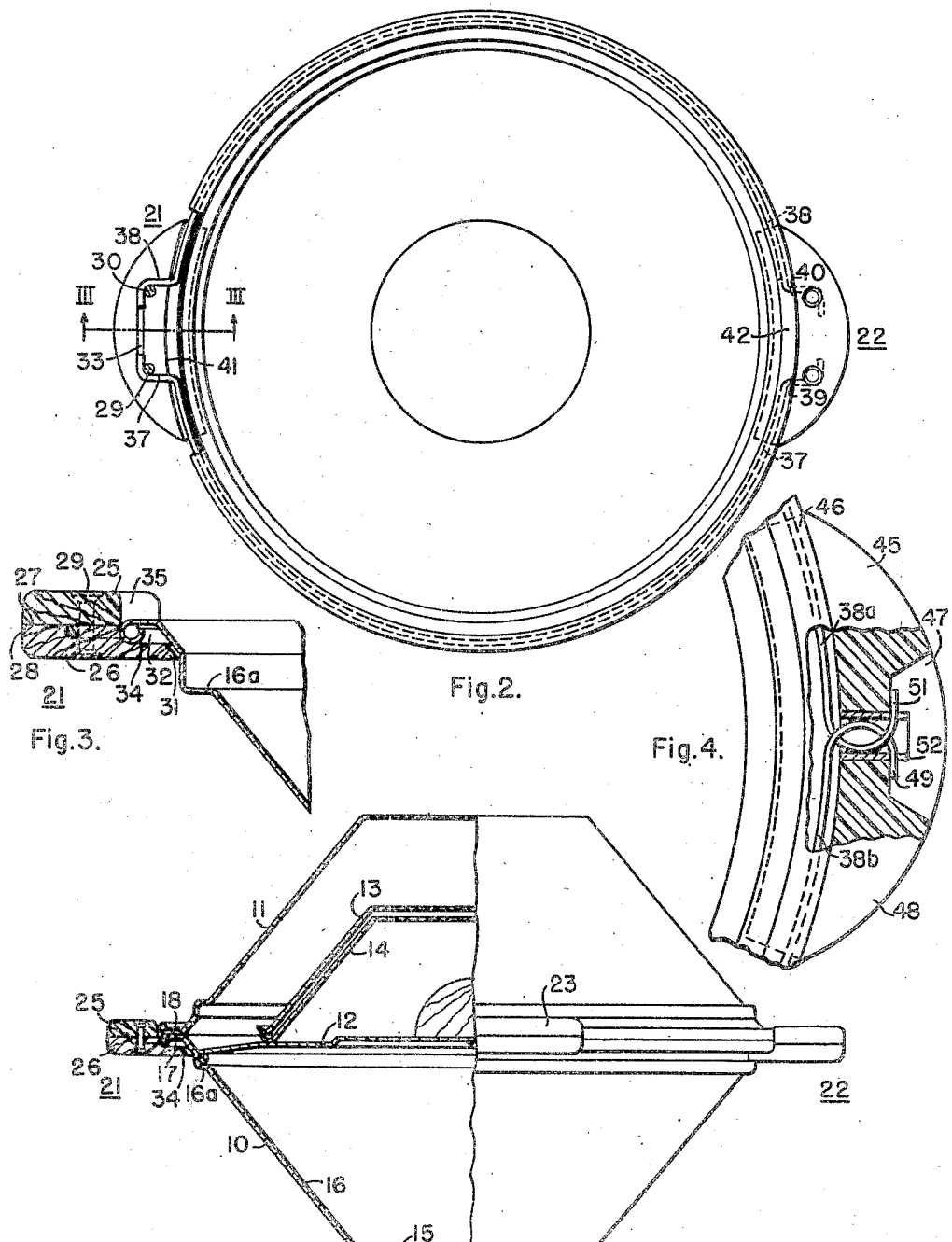
Sept. 1, 1953     O. B. CURRY     2,650,736
POPCORN SERVICE
Filed Jan. 29, 1949
INVENTOR.
Oliver B. Curry.

2,650,736

UNITED STATES PATENT OFFICE 2,650,736

POPCORN SERVICE

Oliver B. Curry, Wichita, Kans.

Application January 29, 1949, Serial No. 73,461

4 Claims. (Cl. 220—4)

My invention relates, generally, to cooking utensils and, more particularly, to a utensil in the form of a complete service for the popping and serving of popcorn. My invention also contemplates a corn popper per se which is comprised of a lesser number of parts than the complete service.

Heretofore, corn poppers of various types have been provided among them the type in which the grains of popcorn are placed in a container and popped by subjecting the container to heat without stirring the corn or agitating it in any manner during the popping procedure. These poppers are for the most part somewhat complicated and expensive in construction and provide only for the popping of corn and do not embody such other elements as are necessary and desirable in the proper serving of popped corn. Furthermore, such poppers are adapted for use only in the popping of corn and are not suitable for other purposes and are not so constituted that they may be readily stored away in a minimum amount of space when not in use.

Accordingly, it is the object of my invention, generally stated, to provide a complete popcorn service for the popping and serving of popcorn which is of simple and inexpensive construction, and which may be readily and economically used for the successful popping of corn, and in which the elements thereof are suitable for other uses.

A more specific object of my invention is to provide a complete popcorn service of such nature that it may be utilized in the popping of corn and certain parts or elements thereof employed thereafter for the serving of the popcorn, such parts or elements having been properly preheated during the popping process.

Another object of my invention is to provide a popcorn service of the character described wherein the service is comprised of a pair of pans adapted to fit closely together to form a closed container, an internal lid member for the lower or popper pan and a plurality of nesting serving dishes adapted to rest either upon the internal lid member or upon the top of the upper pan during the popping process, so that the serving dishes as well as the upper or serving pan are effectively preheated during the popping process.

Another object of my invention is to provide a popcorn service of the character described which may be used for effectively salting the popped corn by removing the serving dishes, serving bowl and internal lid, adding the salt, replacing the serving pan, shaking and finally inverting the pans while held together and finally removing the popper pan, thus leaving the popped corn in a properly salted condition in the serving pan.

A further object of my invention is to provide a popcorn service of the character desired wherein all of the elements or members thereof may be readily nested together into a compact arrangement for storage when not in use.

Another object of my invention is to provide a popcorn service of the character described wherein all of the elements thereof, including the popper pan, the serving pan, serving dishes and internal lid are formed of a readily workable and ornamental thin sheet material, such as aluminum.

A further object of my invention is to provide a corn popper wherein the popper pan is in the general shape of a truncated cone with a relatively small flat bottom portion to which heat is applied and upon which the unpopped grains of corn rest.

A further object of my invention is to provide a corn popper comprised of two substantial identical pans of truncated cone shape, the lower pan being the popper pan, the upper or serving pan being inverted upon the lower pan to function as a cover with the rims of the pans fitting closely together to form a container.

A still further object of my invention is to provide a corn popper of the character described wherein the pans are provided with handles which function to hold the pans in proper alignment when the upper pan is inverted upon the lower pan.

Another object of my invention is to provide a pan for a popcorn service wherein the handles thereof are attached to the rim portion of the pan by means of wire bails positioned in a beaded outer edge of the rim portion.

These and other objects of my invention will become more apparent from the following detailed description of one embodiment of my popcorn service, wherein Figure 1 is a side view, in elevation and partly broken away, of a complete popcorn service embodying my invention, Fig. 2 is a top plan view, partly broken away, of one of the pans of Fig. 1, Fig. 3 is a partial sectional view of the pan of Fig. 2 taken along lines III—III to show the details of the handle construction, and Fig. 4 is a partial top plan view of a pan showing a modification of the handle structure.

In practicing my invention, in the preferred form, the popcorn service comprises a pair of pans of the same size and of truncated cone shape adapted to fit together with the upper pan inverted upon the lower pan to form a closed container. Each pan is provided with a pair of oppositely disposed handles attached to the rims thereof and being so shaped and positioned as to also function to hold the pans in proper alignment. Preferably both of the pans have an internal ledge or shoulder portion below their rims so that the internal ledge of the lower pan may serve as a support for an internal lid for this pan. This lid is also used as a support for a plurality of nesting serving dishes, so that they may be preheated during the popping process. In addition to these parts which are shown in the drawing, the service may include a small measuring cup, not shown, for measuring the corn and cooking oil used in the popping process.

Referring now to Fig. 1, which shows the complete popcorn service with the exception of the measuring cup, it will be observed that the service is comprised of a pair of pans 10 and 11, either one of which is adapted to be inverted upon the other to form a container, an internal lid 12 for the bottom pan and a plurality of nesting serving dishes 13 and 14 (only two being shown but at least 4 contemplated) resting in an inverted position upon the internal lid within the top pan 11.

In this instance, the pans 10 and 11 are shown as being substantially identical in shape and size and are preferably of a truncated cone shape although it is to be understood that identically shaped pans are not required in practicing my invention. When, however, they are of the same shape, either one may be used as the lower or popper pan. In addition, the use of pans of the same shape and size makes it possible to more readily nest all of the elements of the service for storage purposes, as will be described more in detail hereinafter.

Considering pan 10, for example, which is the popper pan, it will be observed that it has a flat bottom portion 15 of relatively small diameter and sloping side walls 16 which terminate in a rim forming a large opening for the pan. A circumferential ledge or shoulder 16a is formed in the side walls adjacent the upper edge thereof to provide a support for the internal lid 12.

In this instance, the slope of the side wall 16 in the pan is shown as about 50 degrees to the horizontal plane through the bottom 15. While this slope is not considered to be critical, it is preferred that it be more than 45 degrees and preferably of the degree shown.

In order to provide for properly sealing the pans at the joint therebetween, their rims are provided by forming the upper edges of the side walls into outwardly extending flanges substantially parallel to the bottoms of the pans. As shown in Fig. 1, the lower pan 10 has a flanged rim 17 and the upper pan 11 a flanged rim 18 which fit closely together so as to provide the necessary seal between the pans during the popping process.

Each pan is preferably provided with a pair of handles 21, 22 and 23, 24. The handle 24 of the upper pan 11 is not shown in Fig. 1, but it is to be understood that it is on the opposite side of the pan from handle 23. These handles also function to properly align the pans when one is inverted upon the other in normal use as shown in Fig. 1. In the embodiment shown in Figs. 1, 2 and 3, the handles are shown as made of wood, although any other suitable material may be used.

The details of the handle construction and the manner in which they are attached to the pans is shown in Figs. 1, 2 and 3. Each handle may comprise two separate parts. Considering handle 21, for example, on the lower pan, it comprises a top part 25 and a bottom part 26 having flat inner faces 27 and 28, respectively, which are held in close engagement by means of suitable rivets 29 and 30 or by means of cement, or both.

The bottom part 26 of the handle is so shaped at its inner edge 31 as to fit the rounded contour of the pan. The rounded or concave inner edge of this part of the handle is recessed at 32 and a U-shaped groove 33 is provided in its flat surface 28. The extending portion 34, which is formed by the recess 32, thus extends under the rim of the pan and engages the sloping side wall, as shown best in Fig. 3.

The top part 25 of the handle is curved on its inner edge 35 to conform to the shape of the rim of the pan, as shown best in Fig. 3, but does not extend over the rim.

The handles may be attached to the rims of their respective pans in any suitable manner, but in this instance it is preferred to attach the handles by means of a pair of wire bails 37 and 38, as shown best in Fig. 2. These wire bails have their opposite ends terminating in the handles, as shown in Fig. 2, and the bails are preferably secured to the pan by beading the outer edges of the rim flange about the bails, as shown in Fig. 1.

Considering pan 10, for example, the outer edge of the flange 17 is rolled or formed downwardly to provide a bead around the bails so that the rim flange has a flat top surface and the ends of the bails are held in the proper position to be received by the handles. The ends of the bails extend outwardly through spaced openings 39 and 40 at the side of the bead. These openings may be formed at the edge of the flange 17 before the bead is formed, the ends of the bails inserted therethrough and the outer edge of the flange then beaded about the bails to secure them to the rim flange. The beaded edge extends entirely around the pans, i. e., the outer edge of the flange 17 is beaded between the adjacent ends of the bails, as at 41 and 42, as well as between the ends of each bail.

The ends of the bails engage the handles, as shown in Fig. 2. The ends of the bails are bent L-shaped, as shown, to engage the U-shaped slot 33 in the bottom part of the handle. The rivets extend through aligned openings in the handle parts, as shown, to securely clamp these parts together upon the ends of the bails.

It will be apparent that the handles are not only secured to the rims of the pans, but the bails being beaded within the outer lip of the flanges function to strengthen and add rigidity to the pans and especially the rims.

This method of attaching the handles also eliminates the necessity for using rivets or any other fastening means in the rims so that all exposed parts of this kind are eliminated and a smooth rim portion provided which may be readily cleaned.

The handles function to hold the pans in proper alignment as shown in Fig. 1. It will be apparent that the rim of the top pan 11 is held in proper position by the top parts of the handles. Considering the handle 21, for example, which is shown enlarged in Fig. 3, it will be apparent that the top portion of the handle extends above the rim and that its inner face 35 is properly curved so that the rim of the upper pan fits between the two handles on the opposite sides of the lower pan. If the pans are reversed in position, the handles on the pan 11 function in the same manner. As a matter of fact, the handles on the upper pan also overlap and engage the rim of the lower pan in the same manner so that the pans are mechanically held in alignment at 4 different points about their periphery.

Referring to Fig. 4, there is shown a modification of the handle construction which also employs a pair of bail members attached to the rim in the same manner but secured to the handles in a different manner. The handles in this instance are also different, this construction being adapted for use with plastic handles, for example, of one-piece construction.

In this instance, the handle 45 is of one-piece construction and is formed insofar as its inner edge 46 is concerned to have the same general shape as the inner edge of the composite handle of Fig. 3, for example. In other words, it fits the edge and rim of the pan in the same manner and extends above the rim in the same manner. It is provided with a lengthwise slot 47 in the outer face 48 and an opening 49 extending from the slot to the inner edge.

The handle is attached by means of bails 38a and 39a which, in this instance, are twisted together at 51 and extend through the opening 49 of the handle. It is preferable to reinforce this opening with a tubular member 52 which is slotted at its ends so that the ends of the bails may be bent backwardly into the slot 47, as shown.

One way in which the various parts of the popcorn service may be assembled for use is shown in Fig. 1. It will be observed that the serving pan 11 is inverted upon the popper pan 10. The internal lid 12 is resting upon the ledge 16a so as to effectively close the popper pan. The nested serving dishes 13 and 14 are resting upon the internal lid 12 within the serving pan 11. These dishes are in such position that they are effectively warmed or preheated during the popping operation. The same is true with respect to the serving pan 11 which is also preheated.

If desired, the nested serving dishes may be placed outside the container formed by the pans and simply allowed to rest upon the serving pan 11 so that the serving pan as well as the serving dishes are preheated during the popping operation.

If desired, the two pans 10 and 11 may be used alone as a corn popper and after the popping operation has been completed, the upper pan 11 used as a serving pan.

The lower pan 10 and the internal lid 12 may be used alone as a corn popper. This would be the simplest form of popper and is a combination which functions effectively in the popping of corn.

In addition to the use of the various parts of the popper service for the purpose of popping corn, it will be apparent that these parts may be used for other purposes. The two pans 10 and 11 function as a bun warmer or the lower pan 10 and the internal lid 12 may be used for the same purpose. The serving dishes 13 and 14 may be used for various purposes other than the serving of popped corn.

When the popcorn service is not in use, it may be readily nested together in a compact arrangement for storage. The pans 10 and 11 are nesting and the nesting serving dishes 13 and 14 readily kept within the nested pans. The internal lid 12 may be used to close the upper of the nested pans so that all of the parts are disposed in a compact arrangement.

The popcorn service is used by simply pouring a measure of grain popcorn mixed with a suitable cooking oil into the popper pan. The internal lid 12 is placed in position and, if desired, the serving pan 11 and serving dishes 13 and 14 likewise placed in position as described hereinbefore.

The popper pan is placed over a source of heat of such nature as to provide a fairly concentrated application of heat to the flat bottom portion of the popper pan only. This may be a small element on an electric range or a small burner on a gas range. The flame should be adjusted so that the bottom only of the popper pan is heated.

Upon application of heat to the popper pan, the grains of popcorn will be effectively popped without further agitation or any other manipulation of the popper service. In other words, there is no necessity for stirring the grains of popcorn or agitating them in any manner.

After the popping operation has been completed the serving pan, serving dishes and internal lid may be removed to expose the popped corn in the popper pan. If it is desired to add salt, it may now be placed in the popper pan with the popped corn, the serving pan again placed in position with the handles of the pans together so they may be grasped by the fingers to hold the pans together, the container shaken and inverted and the popper pan removed. The popped corn, salted and ready to serve, is thus deposited in the serving pan. This is an easy and effective way of properly adding salt to the freshly popped corn without attempting to stir it into a full popper pan.

In view of the foregoing detailed description of a preferred embodiment of my invention, it will be apparent that I have provided a very simple and effective popcorn service for the effective popping of corn as well as the proper serving thereof. The popper service is so constructed that it has a maximum degree of utility and efficiency not only when used as a popcorn popper but also when the various parts thereof are used for other purposes. It is so constructed of a lightweight and ornamental metal that it is of a strong and rigid nature as well as ornamental. It is also constructed in such manner that the various parts thereof may be readily arranged in a compact space for storage.

In addition to the foregoing structural features, the popper service of my invention is of such nature that it efficiently and effectively pops corn with a minimum amount of effort and expense. It is so constructed that the grains of corn are popped without agitation of any kind and if the proper mixture of corn and cooking oil is used, a maximum amount of the unpopped corn is effectively popped.

While I have shown and described a specific embodiment of my invention, it is to be understood that various changes and modifications may be made therein without departing from the principles of the invention.

I claim as my invention:

1. A utensil for popping corn comprising, a metallic pan in the form of a truncated cone having a flat bottom with its outwardly extending side walls terminating in a beaded flat rim portion, a pair of bail members disposed in the beaded rim portion with their ends extending outwardly therefrom in spaced relation on opposite sides of the pan, and handles rigidly secured to the adjacent ends of the bail members and extending outwardly beyond the rim portion with their inner side walls in engagement with beaded rim portion.

2. A utensil for popping corn comprising, a metallic pan in the form of a truncated cone having a relatively small flat bottom with its side walls terminating in a beaded flat rim portion, said bead having spaced openings in the side thereof on opposite sides of the pan, a pair of bail members disposed in the beaded rim portion with their adjacent ends protruding therefrom through the spaced openings, and a handle of non-metallic material rigidly attached to the adjacent protruding ends of the bails at opposite sides of the pan, said handles having a protruding portion extending inwardly below the beaded rim portion in engagement with the outer surface of the side walls of the pan.

3. A corn popper comprising, a pair of metallic pans adapted to fit together with one inverted upon the other with their rims in registering relation to form a container, at least one of said pans being of truncated cone shape with a flat bottom portion of relatively small diameter, and a pair of handle members rigidly attached to the rim of at least one of said pans in opposed relation, said handle members having portions extending above the rim of the pan to which they are attached and having the inner opposed faces of said extended portions curved in accordance with the curvature of the rims of the pans and spaced apart only slightly more than the diameter of the rims, whereby said handle members function to hold the pans in registering relation.

4. A corn popper comprising, a pair of metallic pans adapted to fit together with one inverted upon the other with their rims in registering relation, said pans being substantially identical in shape and size and being of truncated cone shape, said pans having outwardly extending flat rim portions of a flange nature which fit together, and a pair of handles rigidly attached to the rim portion of each pan in opposed relation and having portions extending upwardly beyond the rim portions, said upwardly extending portions of the handles having their opposed inner faces spaced apart so that the rim portion of each pan is engaged by the handles of the other when the pans are placed together with one inverted upon the other with the handles of one displaced from those of the other.

OLIVER B. CURRY.

References Cited in the file of this patent

UNITED STATES PATENTS

| Number | Name | Date |
|---|---|---|
| 42,535 | Jackson | Apr. 26, 1864 |
| 204,975 | Jackson | June 18, 1878 |
| 245,145 | Emmons | Aug. 2, 1881 |
| 369,832 | Bardell | Sept. 13, 1887 |
| 397,869 | Munson | Feb. 12, 1889 |
| 404,268 | Eustis | May 28, 1889 |
| 429,551 | Wainright | June 3, 1890 |
| 857,228 | Boyd | June 18, 1907 |
| 1,003,112 | Johnson | Sept. 12, 1911 |
| 1,646,853 | Grossenbacher | Oct. 25, 1927 |
| 1,773,663 | Dickens | Aug. 19, 1930 |
| 2,258,145 | Woodman | Oct. 7, 1941 |
| 2,336,699 | Neth et al. | Dec. 14, 1943 |

FOREIGN PATENTS

| Number | Country | Date |
|---|---|---|
| 77,484 | Austria | Aug. 11, 1919 |